United States Patent Office 3,455,522
Patented July 15, 1969

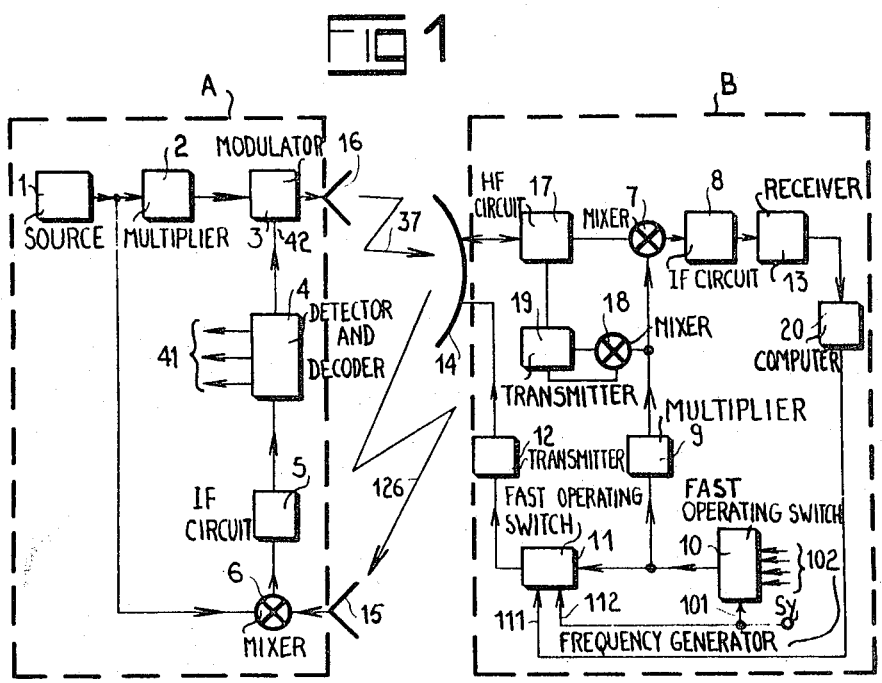
Fig 1
Fig 2
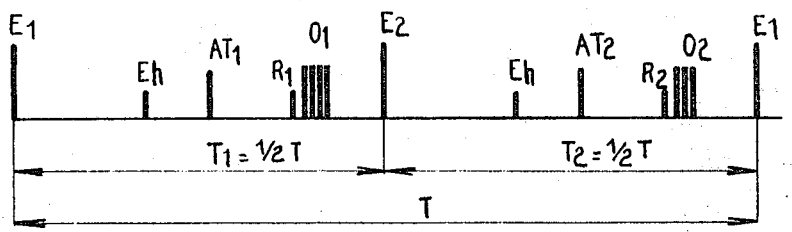

3,455,522
GUIDANCE SYSTEM
Jean Galipon, Chatillon-sous-Bagneux, France, assignor to Compagnie Francaise Thomson Houston-Hotchkiss-Brandt, Paris, France, a corporation of France
Filed Nov. 3, 1967, Ser. No. 680,513
Claims priority, application France, Nov. 18, 1966, 84,173
Int. Cl. F41g 7/14
U.S. Cl. 244—3.14                                  8 Claims

ABSTRACT OF THE DISCLOSURE

A radio guidance system wherein there is established at the control station B, a predetermined relation between the carrier frequency of the distant control equipment and the local frequency of the associated radar equipment. Likewise, aboard the missile (A), a predetermined relation is established between the local frequency of the airborne distant control receiver (5) and the carrier frequency of the transponder. The result is a predetermined relation established between the respective intermediate frequencies of both the receiver aboard the guided missile and the radar equipment at the control station.

---

The present invention relates to guidance systems and concerns more particularly a guidance system for missiles equipped with transponders, the guidance operation being controlled from control stations which are either fixed or moving.

In its conventional form, an equipment designed for guiding missiles each equipped with a transponder, generally consists of two parts. A first called telemetry part consists of a radar transmitter-receiver equipment at the station and a transponder aboard the missile, enabling the localisation of one or several missiles with respect to the target. For this end the radar transmitter transmits a signal the frequency of which is the telemetry frequency which is received aboard the missile, the transponder of which sends back to the radar receiver a signal, the frequency of which is almost identical with the telemetry frequency, i.e. the frequency of the signal reflected back by the target when hit by the transmitted radar pulse; the equality between these two frequencies is obtained by bringing the telemetry frequency under the control of the transponder frequency. The second part of the equipment is the remote control part consisting of a transmitter at the control station and a corresponding receiver aboard the missile for controlling its attitude, this receiver on board receiving from the remote control transmitter signals the frequency of which is the remote control frequency. Generally this distant control part of the equipment comprises a local oscillator aboard the missile which is different from that operating with the telemetry part.

In conventional systems, the telemetry and remote control frequencies are independent; this leads to the utilisation of at least four distinct oscillating sources resulting in complicated associated servo-mechanisms.

In systems of that kind, the frequency acquisition of a transponder is not immediate, being achieved by a frequency sweep, at the control station, made over a frequency band depending on the possible frequency range of the transponders. This effects the capability of the system to withstand jamming. Further, the great variations of the response amplitude during the flight of the missile may produce a non negligible shift of the frequencies aboard the missile and at the control station, resulting in the deterioration of the guidance system stability. Furthermore the possibility with conventional systems to simultaneously receive at the control station the response from the missile and the reflected signal from the target leads to complex receiving equipment as such a reception is to be avoided. Besides, when the missile is on its launcher, there is necessary to provide an extra link between the telemetry parts of both the missile and the control station.

An important object of the present invention is to overcome the above mentioned drawbacks, by designing a radio guidance system for missiles each equipped with a transponder, in which the telemetry and remote control parts are made dependent. This dependency is in particular, made possible by using solid-state sources.

Another important object of the invention is a radio guidance system capable of guiding $n$ missiles each equipped with a transponder, by the provision at the control station of a frequency generator which may comprise up to $n$ solid state sources. This generator is connected to a fast operating switch which rapidly selects at a given instant a given frequency.

A preferred embodiment with only two independent solid state sources will be disclosed in detail. The system according to the invention is partly based on technological progress of the oscillating sources. Those which were used in conventional systems, which resort to the prior art, were generally klystrons the frequency stability of which was about $10^{-3}$, while now, the solid state sources have a stability factor of about $10^{-6}$, enabling selection of telemetry and remote control frequencies tied to each other by a predetermined relation. This also makes it possible to simultaneously guide up to $n$ missiles by the use of a frequency generator comprising $n$ independent solid state sources, without more intricate of bulky equipment. In systems of the kind according to the invention it is furthermore easy, due to the dependency of the telemetry and remote control parts aboard the missile, to transmit to and derive from controls of the missile suitable information allowing to control its attitude.

SUBJECT MATTER OF THE INVENTION

At least two independent sources are provided, one at the control station and the other aboard the missile, the first generating a wave of which the frequency is the remote control frequency, feeding to a multiplier wherein it is multiplied by a predetermined factor thereby producing the local oscillation to the radar equipment. The source aboard the missile generates a wave of a frequency which is the local frequency of the remote control receiver feeding to a multiplier wherein it is multiplied by a predetermined factor thereby producing the transmission carrier of the transponder.

Other objects, features and advantages of the invention will become apparent in the following description of an embodiment with reference to the accompanying drawing in which:

FIG. 1 represents a block diagram of the radio guidance system and FIG. 2 is a diagram showing as a function of time how the simultaneous guidance of two missiles is organized.

The radio guidance system of FIGURE 1 comprises two distinct parts or sub-assemblies, a first part referenced A being aboard the missile and a second part referenced B being the control station.

The sub-assembly A comprises the necessary means to answer the interrogation from the guidance radar, and to receive and interpret the commands sent to it by the control station. On board the missile, there is a solid state source 1 acting as a local oscillator which feeds a mixing stage 6 connected to a receiving aerial 15 and to a IF channel which is symbolized by circuit 5, itself connected to circuit 4 assuming functions of detection and decoding of the transmitted command signals. This circuit 4 is capable of directly operating the controls of the missile through its outputs 41 and through its output 42, it triggers a modulating circuit 3 inserted in a chain connected to the source 1 through a multiplier 2 and also to a transmitting aerial 16, which transmits the reply of the missile upon the interrogation from the control station.

The sub-assembly B at the control station comprises a telemetry and a remote control part. The telemetry part is a radar system having a transmitter and a receiver which contribute to the localization and the tracking of the target and simultaneously of the missiles which must be directed to this target.

In the exemplary embodiment which is here described, the radar is of the monopulse type wherein the signals collected by the aerial at the reception are combined in a known manner and analyzed with respect to their phase angle. A monopulse receiver will not be here detailed but only the parts directly in connection with the invention. A detailed description of the monopulse receiver such as that used in the present invention may be found in the literature.

Generally, the radar part of the sub-assembly B comprises an aerial 14 common for the transmission and the reception of signals. To this aerial is connected an HF circuit 17 enclosing a duplexer the role of which is known by the skilled engineers. On transmission, this HF circuit is connected to the transmitter 19, the frequency of which is controlled by the solid state source 102 through mixer 18, said source being in common with the radar and the remote control part of the equipment located at the control station. On reception, this HF circuit 17 is connected to a chain of IF circuits 8 connected to the radar receiver 13, through a mixer 7 fed by the solid state source 102 through a multiplier 9. The data delivered by the receiver feed a computer 20 which delivers to the radar transmitter the suitable data for the automatic tracking of the target and also calculates the commands to be sent to the missiles to follow and hit the target to be destroyed. These commands are transmitted through a remote control transmitter at the control station B.

The remote control part of the sub-assembly B consists of a receiver referred to as circuit 12 which is controlled by a fast operating switching device 11 which is connected on the one hand to the solid state source 102 and on the other hand to the computer 20 wherefrom it receives information through input 111. The remote control signals from transmitter 12 are transmitted through aerial 14, already cited in connection with the radar equipment above described.

It will be noticed that in the description of the material involved, no mention has been made of servo mechanisms. These are not described despite the fact they exist but they are not part of the invention and in any case they are known by engineers skilled in the art.

The operation of the above described equipment will now be explained.

A target being detected by any means including the radar at the control station, the latter automatically, in one preferred way, tracks the target together with the missiles which are launched to intercept it.

According to a preferred embodiment of the invention, the number of missiles which are simultaneously launched and thence tracked by the radar is two but this number might be greater. Actually, the radar equipment at the control station comprises two transmitters which operate alternately. The frequencies needed therefor are selected from frequency generator 102. For generating these frequencies, the generator 102 comprises two solid state oscillators which are connected to a fast operating electronic switch 10, alternately transmitting the one and the other frequency to multiplier circuit 9, this switch being controlled by the synchronization generator Sy of the radar through connection 112.

FIGURE 2 shows how the operation of the system is taking place as a function of time.

The repetition period of the radar being denoted T, there is allotted half of this period for each radar pulse to be transmitted at either frequency. In the first half period T1, a first radar pulse E1 at a first frequency F1 is transmitted while in the second half period T2 a second radar pulse E2 at frequency F2 is transmitted. The pulse $Eh$ represents in each half period, the echo of the target. The signal AT1 represents the address of the first missile, that is the interrogation signal sent by the control station to the first missile for purpose of identification. After decoding (in circuit 4), the signal actuates the transponder aboard the missile which transmits its reply R1 to the interrogation. By O1 is symbolized a message to the first now identified missile. Such a message may consist of commands transmitted through the remote control channel (circuits 11–12, antenna 14, link 126, antenna 15, circuits 6, 5, 4) to actuate controls such as pitch or yaw control or also command to trigger the proximity fuse or the like. The same applies to the second half period T2 where AT2 is the interrogation signal to missile number two, R2 the reply of said missile, and O2 is a message carrying commands to control the attitude or course of the missile number two.

It will be noticed from the drawing of FIGURE 2 that the echo pulses $Eh$ cannot be received simultaneously with the answers R1 or R2 of the interrogated missiles.

The selection of a transmitting frequency F1 being made by the fast operating switch 10, which may be of the diode type, controlled at 101 by a signal from synchro-generator Sy, the multiplier stage 9, the multiplicating factor $k$ of which may be chosen as 2, delivers a waveform of frequency $kF1$ to the mixer 18, connected to the transmitter 19 feeding the aerial 14, through HF circuit 17. The transmitting aerial which in a preferred form is of the Cassegrainian type, transmits towards the target, a pulse E1 and receives back from the struck target an echo pulse $Eh$ which is dealt with in the receiving part of the radar equipment. The received signal passes through HF circuit 17, which is connected to the mixer stage 7 fed by the local oscillation at frequency $kF1$ from multiplier 9 as said before. The intermediate frequency signal from mixer 7 is processed in IF circuit 8 feeding the receiver 13 the output of which is connected to computer 20. The computer 20 calculates from the data received, the distance, bearing and elevation of the target, deduces therefrom the errors with respect to the results obtained at the preceding period, and transmits them to the different suitable members of the transmitter, which are here not described, for automatic tracking purpose. As is shown on the FIGURE 2, there is also, in addition to transmitting the radar pulse E1 in the first half of the repetition period, transmission of an address AT1 to the first missile, which is tracked by the radar equipment as is the target.

The same source 102, which delivers a waveform of frequency F1 which is selected by the switch 10, feeds a second switch 11, being also a switch of the diode type, which controls the operation of the remote control transmitter 12. When this switch 11 is blocked, the waveform at frequency F1 is applied, as it has been seen before, to the multiplier 9. As switch 10, this switch 11 is controlled by the radar synchro-generator Sy, in a manner known per se so that it is passing or not and the waveform F1 (or F2 in the second half of the repetition period) is flowing through this switch or not. Besides, the switch 11 is connected by 111 to the computer 20 from which it receives data concerning the addressing or guidance of the missile concerned. The address command AT1 is transmitted as a coded pulse train, which passing through circuit 12 is radiated by aerial 14 which is in common with either the tracking radar and the remote control equipment.

It will be noticed from the foregoing that the frequency of the local oscillation of the radar is the $k$th harmonic wave of the remote control transmitting wave, i.e. for instance F1. The desired dependency between the radar and the remote control part at the control station is thus achieved.

Aboard the missile, the equipment denoted A comprises as it has been said before, a solid state source 1 which generates a wave of frequency F3. This source constitutes a local oscillator directly feeding to the mixer stage 6, connected to the remote control receiving aerial 15, which receives the distant control signal 126 carrying the address message AT1 to the missile to be interrogated. This signal is at frequency F1. The resulting signal from mixer 6, is at the intermediate frequency $F1+F3$ and is processed in the IF chain 5, feeding to circuit 4, generally referred to as detecting and decoding circuit. Actually, this circuit detects and decodes the address message AT1, and triggers by 42, the modulator 3, so that the reply signal from the interrogated missile is transmitted (37). This modulator 3 is fed through multiplier circuit 2, with the wave generated by the solid state source 1. It will be noted that the multiplying factor of this circuit 2 is chosen equal to $k$ as for circuit 9 at the control station. The reply R1 of the missile number one, is thus transmitted by aerial 16 at the frequency $kF3$. This reply R1 is received by aerial 14 and processed in the radar equipment at the control station.

The frequency at which the transponder aboard the misputer 20 determines the instruction to be sent to the missile via the remote control channel so that it is guided along a collision trajectory to the target to be destroyed. For this end the computer 20 delivers data relating to pitch and yaw or the firing of the proximity fuse of the missile or also to its self destruction (O1 or O2), and these data modulate the wave at frequency F1 transmitted through switch 11.

Obviously all the foregoing applies to the second missile in the second half of the repetition period and need not be repeated. It will be noted from what precedes that the dependancy looked for between the tracking radar and the remote control equipment has been made possible by the use of solid state sources which provide a high stability. This particular point has resulted in the elimination of the missile acquisition procedure by a frequency sweep in the frequency range of the missile transponder. This frequency sweep was intricate, due to the fact that the guidance systems resorting to the prior art were using four independant sources instead of two as in the present invention. In the embodiment described this dependency is achived in the intermediate frequency range.

The two independent sources are these which generate the local oscillation wave of frequency F3 aboard the missile and the transmitting wave at the control station of frequency F1.

The radar transmitting frequency related to the missile number one is derived from the wave at frequency F1 from source 102. This frequency is multiplied by $k$ in multiplier 9 so that the frequency of the local oscillation of the radar is $k$ times the remote control frequency, so that the transmitting radar frequency contains the term $kF1$.

The frequency at which the transponder aboard the missile sends its reply is $k$ times (achieved in multiplier 2) the local frequency F3 delivered by source 1. This reply frequency is then $kF3$. Now, the telemetry intermediate frequency at the control station results from the combination of the frequency at which the transponder sends the reply, i.e. the reply frequency of the missile and of the local oscillation of the radar receiver. This intermediate frequency is then expressed as $MFB=k(F3\pm F1)$.

The intermediate frequency of the remote control part aboard the missile is produced in mixer 6 and is expressed as $MFA=F1\pm F3$. It results from the foregoing that the telemetry intermediate frequency is $k$ times the remote control intermediate frequency: $MFB=k(MFA)$.

This relationship illustrates the degree of interdependency providing good operational performance of the guidance system and a high capability of withstanding jamming.

A particularly interesting embodiment of the guidance system according to the invention is obtained with $k=2$. In that case, the different circuits involved in the system are easily realizable in accordance with conventional techniques.

What I claim is:
1. A radio guidance system for missiles guided towards a target, comprising
   a ground control station having control equipment, including a first source;
   a first ground means for localizing and tracking said target and said missiles, said first ground means operating on a first frequency derived from said first source;
   and second ground means to send coded information to the missiles to be guided, said second ground means operating on a second frequency derived from said first source;
   airborne equipment located on said missiles;
   a second source located on said missiles;
   said missiles having first airborne means to transmit, on a third frequency derived from said second source, an identification signal in response to a signal from said first ground means and forming part of ground information;
   second airborne means operating on a fourth frequency derived from said second source to detect and decode information received from said ground control station at said second frequency, said airborne equipment triggering the transmission of an information signal in a first step, and to actuate the controls of said missile in response to a signal forming another part of said information in a second step;
   said first and second sources being independent while establishing a predetermined relation between the frequencies of said first and second means in each of said equipments.

2. A radio guidance system according to claim 1 wherein said frequency generator includes several osstate type.

3. A radio guidance system as claimed in claim 1 wherein the control equipment at the ground control station comprises multiplication means fed directly from the first source and the airborne equipment comprises multiplication means fed directly from the second source aboard the missile, wherein further the multiplying factors of both said multiplication means are the same whereby there is established a predetermined relation between the intermediate frequencies arising at both equipments, the one said intermediate frequency being the harmonic of the other said intermediate frequency by the said multiplying factor.

4. A radio guidance system as claimed in claim 3 wherein said multiplying factor is chosen equal to 2.

5. System according to claim 1 wherein the means for localizing and tracking said target together with said missiles launched against it consist of radar equipment including a transmitter and a receiver, and the means for sending information to the missiles to be guided consist of a remote control assembly;
   and said first source includes a frequency generator, common to both said radar equipment and said remote control equipment, whereby the remote control carrier frequency and the local frequency of the radar equipment are tied together by a predetermined relationship.

6. System according to claim 5 including transmitting means for remote control information derived from said remote control assembly;
   wherein said frequency generator includes several oscillators to enable said equipment to control several missiles;

first switch means are provided to select one oscillator at a time to control a single missile;

a multiplication means;

and second switch means to connect, when said second switch means is dropped, said selected oscillator to said multiplication means and to provide local oscillations to the radar equipment and, alternatively, to connect, when said second switch means is closed, said selected oscillator to said transmitting means of said remote control assembly to provide remote control carrrier frequencies thereto.

7. A control equipment according to claim 6 wherein said frequency generator consists of two oscillators, enabling the control of two missiles simultaneously, the first missile being monitored during the first half of the radar repetition period whereas the second missile is monitored during the second half of said radar repetition period and furthermore, the first part of the information sent to said missile(s) is transmitted in said half period after the echo from the target is returned back.

8. System according to claim 1 wherein said airborne equipment includes a receiver and a transmitting means, said second source includes an oscillator; a multiplication means is provided fed by said oscillator to provide carrier frequency to said transmitting means;

mixing means connected to said oscillator and receiving local oscillations and providing a mixed signal to the receiving means, said receiving means receiving information from the remote control equipment of the ground control station, said airborne transmitting means being first triggered to supply identification signal and, thereafter, said receiver providing signals to control the operation of said missile in accordance with information received from said ground control station.

References Cited

UNITED STATES PATENTS

| | | | |
|---|---|---|---|
| 2,509,218 | 5/1950 | Deloraine | 325—39 |
| 2,950,477 | 8/1960 | Alpers | 244—3.14 X |
| 3,051,902 | 8/1962 | Ross | 325—40 |
| 3,126,172 | 3/1964 | Parkinson et al. | 244—3.13 |
| 3,134,972 | 5/1964 | Barth et al. | 244—3.14 X |
| 3,156,435 | 11/1964 | Norton et al. | 244—3.14 |
| 3,179,355 | 4/1965 | Pickering et al. | 244—3.14 |
| 3,182,930 | 5/1965 | Randolph et al. | 244—3.13 |

VERLIN R. PENDEGRASS, Primary Examiner